United States Patent
Yerfule et al.

(10) Patent No.: US 10,545,791 B2
(45) Date of Patent: Jan. 28, 2020

(54) METHODS TO APPLY IOPS AND MBPS LIMITS INDEPENDENTLY USING CROSS CHARGING AND GLOBAL COST SYNCHRONIZATION

(71) Applicant: HEWLETT PACKARD ENTERPRISE DEVELOPMENT LP, Houston, TX (US)

(72) Inventors: Sourabh Yerfule, San Jose, CA (US); Gurunatha Karaje, San Jose, CA (US); Mandar Samant, San Jose, CA (US); Sagar Trehan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/411,231

(22) Filed: Jan. 20, 2017

(65) Prior Publication Data
US 2017/0132040 A1 May 11, 2017

Related U.S. Application Data

(63) Continuation-in-part of application No. 15/277,779, filed on Sep. 27, 2016, which is a continuation of
(Continued)

(51) Int. Cl.
*G06F 9/46* (2006.01)
*G06F 9/48* (2006.01)
(Continued)

(52) U.S. Cl.
CPC ............ *G06F 9/4881* (2013.01); *G06F 3/061* (2013.01); *G06F 3/067* (2013.01); *G06F 3/0655* (2013.01);
(Continued)

(58) Field of Classification Search
CPC ...... G06F 9/4881; G06F 3/061; G06F 3/0655; G06F 3/0688
See application file for complete search history.

(56) References Cited

U.S. PATENT DOCUMENTS

| | | |
|---|---|---|
| 6,675,190 B1 | 1/2004 | Schabernack et al. |
| 6,938,256 B2 | 8/2005 | Deng et al. |
| (Continued) | | |

OTHER PUBLICATIONS

Pure Storage, Inc., "The Purity Operating Environment: Storage software born for flash," Jul. 26, 2013, <https://web.archive.org/web/20130726212513/http://www.purestorage.com/flash-array/purity.html>.

*Primary Examiner* — Camquy Truong
(74) *Attorney, Agent, or Firm* — Hewlett Packard Enterprise Patent Department

(57) ABSTRACT

Methods for scheduling operations in a scheduler hierarchy of a storage system. One method includes scheduling a first IO having a first cost at a first flow scheduler of a first flow configured to schedule IOs accessing a volume as executed on a first core processor. A global cost is updated with the first cost, wherein the global cost is shared by a plurality of flows of a plurality of core processors. An intervening cost is determined of at least one IO possibly scheduled before the first set of IOs by one or more flow schedulers of one or more flows configured to schedule IOs accessing the volume as executed on the plurality of core processors. A current cost is updated based on the first cost and the intervening cost. IOs and MBPS limits are set independently for the volume, each controlling scheduling through a corresponding accumulating current cost.

18 Claims, 10 Drawing Sheets

Related U.S. Application Data application No. 14/748,179, filed on Jun. 23, 2015, now Pat. No. 9,483,187.

(60) Provisional application No. 62/058,015, filed on Sep. 30, 2014.

(51) Int. Cl.
*G06F 3/06* (2006.01)
*G06F 9/50* (2006.01)
*H04L 29/08* (2006.01)

(52) U.S. Cl.
CPC .......... *G06F 3/0659* (2013.01); *G06F 3/0688* (2013.01); *G06F 9/5027* (2013.01); *G06F 9/5038* (2013.01); *H04L 67/1097* (2013.01); *H04L 67/2842* (2013.01); *H04L 67/2852* (2013.01); *H04L 67/32* (2013.01); *H04L 67/322* (2013.01)

(56) References Cited

U.S. PATENT DOCUMENTS

| | | | |
|---|---|---|---|
| 7,334,162 B1 | 2/2008 | Vakrat et al. | |
| 7,783,852 B2 * | 8/2010 | Lahiri | G06F 12/023 707/812 |
| 7,941,527 B1 | 5/2011 | Jacoby et al. | |
| 8,041,808 B1 | 10/2011 | Becker | |
| 8,458,509 B1 | 6/2013 | Sreegiriraju et al. | |
| 8,848,723 B2 | 9/2014 | Sundararaman et al. | |
| 9,160,684 B2 | 10/2015 | Sundararaman et al. | |
| 9,367,366 B2 * | 6/2016 | Xiong | G06F 9/52 |
| 9,558,250 B2 * | 1/2017 | Sun | G06F 17/30557 |
| 9,871,855 B2 | 1/2018 | Likhtarov et al. | |
| 2004/0181594 A1 | 9/2004 | Suleiman | |
| 2006/0280119 A1 * | 12/2006 | Karamanolis | G06F 9/50 370/229 |
| 2007/0064711 A1 | 3/2007 | Wang et al. | |
| 2007/0226332 A1 | 9/2007 | Becker-Szendy et al. | |
| 2008/0222311 A1 | 9/2008 | Lee et al. | |
| 2009/0164274 A1 | 6/2009 | Narayanaswamy et al. | |
| 2010/0083262 A1 | 4/2010 | Gulati et al. | |
| 2010/0162253 A1 | 6/2010 | Jeong | |
| 2011/0265083 A1 | 10/2011 | Davis | |
| 2011/0314182 A1 | 12/2011 | Muppirala et al. | |
| 2012/0020368 A1 | 1/2012 | Sundararaman et al. | |
| 2012/0023498 A1 | 1/2012 | Sundararaman et al. | |
| 2012/0060168 A1 | 3/2012 | Lee et al. | |
| 2012/0063313 A1 | 3/2012 | Zhou et al. | |
| 2013/0326064 A1 | 12/2013 | Gulati et al. | |
| 2014/0130055 A1 | 5/2014 | Guha | |
| 2014/0281121 A1 | 9/2014 | Karamcheti et al. | |
| 2015/0373049 A1 | 12/2015 | Sharma et al. | |
| 2016/0021172 A1 | 1/2016 | Mahadevan | |
| 2016/0044126 A1 | 2/2016 | Mahadevan et al. | |
| 2016/0077571 A1 | 3/2016 | Sagar et al. | |
| 2016/0092108 A1 | 3/2016 | Karaje et al. | |
| 2016/0092272 A1 | 3/2016 | Karaje et al. | |
| 2016/0275422 A1 * | 9/2016 | Chape | G06Q 10/067 |
| 2016/0291885 A1 | 10/2016 | Pendharkar et al. | |
| 2017/0010919 A1 | 1/2017 | Yerfule et al. | |
| 2017/0177221 A1 | 6/2017 | Trehan et al. | |
| 2017/0177222 A1 | 6/2017 | Singh et al. | |
| 2017/0286516 A1 * | 10/2017 | Horowitz | G06F 17/30371 |
| 2017/0293426 A1 | 10/2017 | Karaje et al. | |
| 2018/0067771 A1 | 3/2018 | Frandzel et al. | |
| 2018/0081832 A1 | 3/2018 | Longo et al. | |
| 2018/0267728 A1 | 9/2018 | Booth et al. | |

* cited by examiner

METHODS TO APPLY IOPS AND MBPS LIMITS INDEPENDENTLY USING CROSS CHARGING AND GLOBAL COST SYNCHRONIZATION

CROSS REFERENCE TO RELATED APPLICATIONS

This application is continuation-in-part and claims priority to and the benefit of commonly assigned, co-pending U.S. patent application Ser. No. 15/277,779, entitled Quality of Service Implementation in a Networked Storage System with Hierarchical Schedulers," filed on Sep. 27, 2016; which is a continuation of and claims priority to U.S. patent application Ser. No. 14/748,179, entitled "Quality of Service Implementation in a Networked Storage System with Hierarchical Schedulers," filed on Jun. 23, 2015; which claims priority to and the benefit of U.S. Provisional Patent Application Ser. No. 62/058,015, entitled "Quality of Service Implementation in a Networked Storage System with Hierarchical Structures," filed on Sep. 30, 2014, all of which are hereby incorporated by reference in their entireties.

TECHNICAL FIELD

The present embodiments relate to methods, systems, and programs for scheduling operations in a scheduler hierarchy of a data storage system, and more particularly, cross-charging of costs incurred when executing operations across the various flow schedulers of one or more flows of one or more processing cores that are accessing a particular portion of a data storage system (e.g., LUN, volume, etc.).

BACKGROUND

Network storage, also referred to as network storage systems or data storage systems, is computer data storage connected to a computer network providing data access to heterogeneous clients. Typically, network storage systems process a large amount of Input/Output (IO) requests, and high availability, speed, and reliability are desirable characteristics of network storage. In addition to processing read and write IO requests, network storage systems need to perform other background operations required for maintaining these systems, such as garbage collection of obsolete data and compaction of data (e.g., merging contents of two half-filled segments into one full segment), creating snapshots of data, backup, and replication procedures, etc.

A flow of a particular processing core could be responsible for serving both read and write operations to a particular, defined portion of a storage system (e.g., LUN, volume, etc.). Generally, a flow has two separate flow scheduler queues, one for read operations, and one for write queues. In addition, in a multi-core processing environment, each processing core may handle a similar flow for accessing the same defined storage. For example, multiple flow schedulers are integrated within a corresponding flow for access to the storage, including write access flow, read access flow, etc. Each flow scheduler is configured to schedule operations from its corresponding queue of operations. However, rate limiting the entire flow across all schedulers is challenging because the queues act independently of each other, and as such no single queue has knowledge of the number of IOs being served by another queue.

What is needed are network storage device, software, and systems that provide for accounting for all IOs scheduled by all flow schedulers accessing a particular, defined portion of a storage system.

It is in this context that embodiments arise.

SUMMARY

The present embodiments relate to solving one or more problems found in the related art, and specifically to provide for fair utilization of system resources of a data storage system. In particular, methods and systems are presented for accounting for all IOs scheduled by all flow schedulers (e.g., write flow scheduler, read flow scheduler, remote write flow scheduler, continue flow scheduler, etc.) at a single common location through the use of a shared currency. In that manner, each instance of any flow scheduler and its queue has a view of the costs incurred by other instances of the other flow schedulers and their queues. That is, costs related to each IO scheduled is cross-charged throughout the flow schedulers of the distributed flows of processing cores, wherein each flow scheduler accesses the same defined portion (e.g., LUN, volume, etc.) of a storage system. Cross-charging is achieved through the use of a shared currency. It should be appreciated that the present embodiments can be implemented in numerous ways, such as a method, an apparatus, a system, a device, or a computer program on a computer readable medium. Several embodiments are described below.

In one embodiment, a method for scheduling operations in a storage system including a scheduler hierarchy is disclosed and includes scheduling a first IO at a first flow scheduler of a first flow configured to schedule IOs accessing a volume as executed on a first core processor, wherein the first IO has a first cost. The method includes updating an accumulating global cost with the first cost, wherein the global cost is shared by a plurality of flows of a plurality of core processors of a CPU. The method includes determining an intervening cost of at least one IO possibly scheduled before the IO by one or more flow schedulers of one or more flows configured to schedule IOs accessing the volume as executed on the plurality of core processors. The method includes updating an accumulating current cost based on the first cost and the intervening cost. The method includes independently setting IOPS and MBPS limits for the volume, each of which for controlling scheduling of IOs through a corresponding accumulating current cost.

In still another embodiment, a data storage system includes first and second memory controllers, each of which comprises a central processing unit (CPU) including a plurality of core processors and a non-volatile memory (NVRAM) for storing incoming write requests. The data storage system includes a solid state drives/memory (SSD) configured as a read cache memory, and a hard drive (HDD) configured for permanent data storage. During scheduling of operations, a first flow scheduler of one of the core processors is configured to schedule a first IO at the first flow scheduler of a first flow configured to schedule IOs accessing a volume as executed on a first core processor, wherein the first IO has a first cost. The first flow scheduler is also configured to update an accumulating global cost with the first cost, wherein the global cost is shared by a plurality of flows of the plurality of core processors. The first flow scheduler is also configured to determine an intervening cost of at least one IO possibly scheduled before the first set of IOs by one or more flow schedulers of one or more flows configured to schedule IOs accessing the volume as executed on the plurality of core processors. The first flow scheduler is also configured to update an accumulating current cost based on the first cost and the intervening cost.

In still another embodiment, a non-transitory computer-readable medium storing a computer program for scheduling operations in a storage system is disclosed. The computer-readable medium includes program instructions for scheduling a first IO at a first flow scheduler of a first flow configured to schedule IOs accessing a volume as executed on a first core processor, wherein the first IO has a first cost. The computer-readable medium includes program instructions for updating an accumulating global cost with the first cost, wherein the global cost is shared by a plurality of flows of a plurality of core processors of a CPU. The computer-readable medium includes program instructions for determining an intervening cost of at least one IO possibly scheduled before the first set of IOs by one or more flow schedulers of one or more flows configured to schedule IOs accessing the volume as executed on the plurality of core processors. The computer-readable medium includes program instructions for updating an accumulating current cost based on the first cost and the intervening cost.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that provide for performing cross-charging of costs when scheduling IOs accessing a portion of a data storage system (e.g., LUN, volume, etc.) in a scheduler hierarchy as implemented across a plurality of cores. The costs can be used for providing rate limiting access to the particular portion of the data storage system.

With the above general understanding of the various embodiments, example details of the embodiments will now be described with reference to the various drawings. Similarly numbered elements and/or components in one or more figures are intended to generally have the same configuration and/or functionality. It will be apparent, that the present embodiments may be practiced without some or all of these specific details. In other instances, well-known process operations have not been described in detail in order not to unnecessarily obscure the present embodiments.

Figure 1:
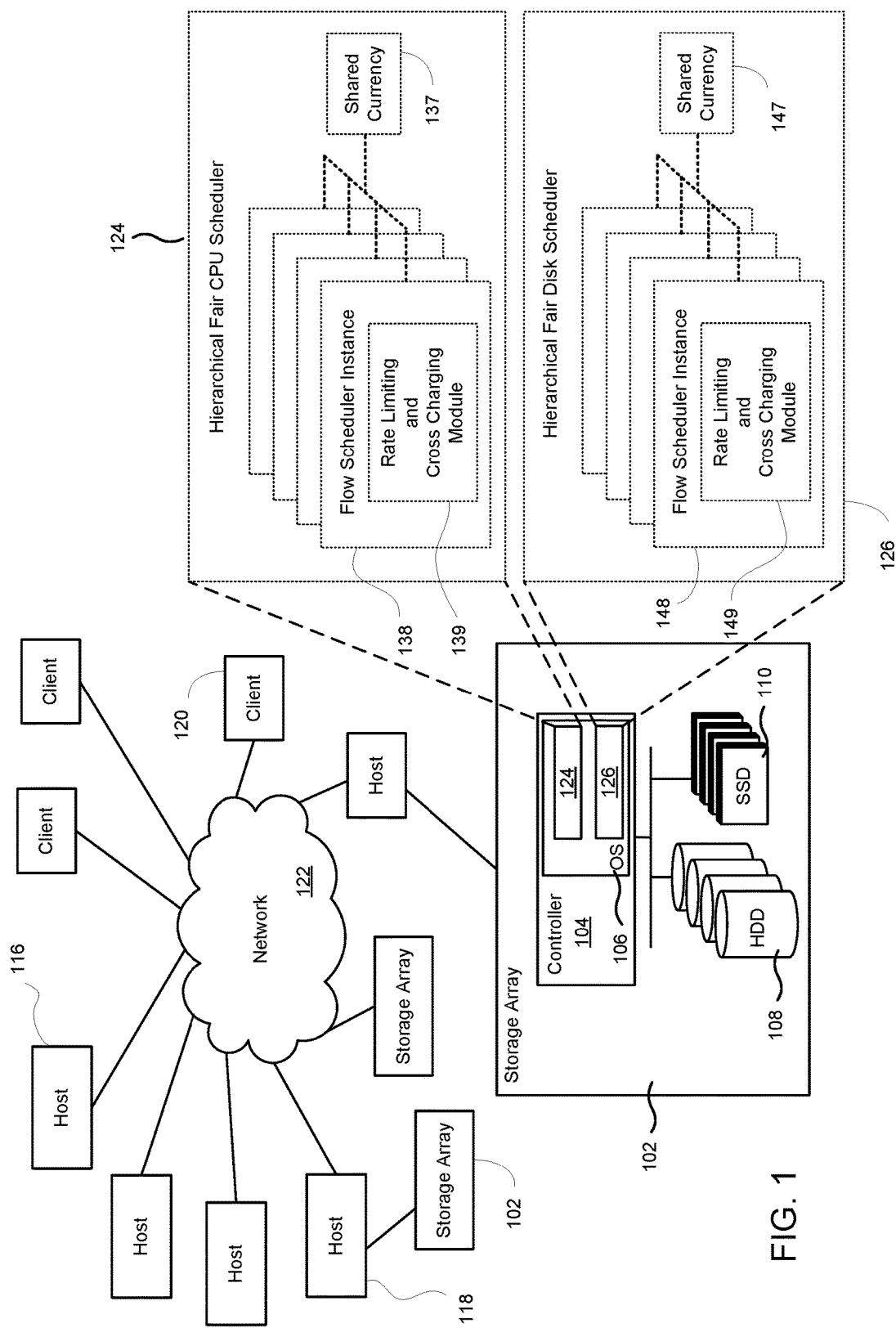
FIG. 1 depicts a system with network storage, in accordance with one embodiment of the present disclosure.

FIG. 1 depicts a system with network storage, according to one embodiment. The networked storage device, also referred to herein as a storage array 102 or a data storage system, includes a controller 104 with a storage operating system 106, which is a multitasking system able to execute several tasks concurrently. One or more tasks are configured to process IO requests, and these tasks that process IOs are referred to herein as foreground tasks. Background tasks are tasks that do not cause a host initiator to wait for their output. For example, background tasks may include system maintenance tasks (e.g., processing an alert when resource consumption reaches a threshold, taking a scheduled snapshot, garbage collection (GC), etc.). More particularly, the operating system 106 is configured to perform cross-charging of costs when scheduling IOs accessing a portion of a data storage system (e.g., LUN, volume, etc.) in a scheduler hierarchy as implemented across a plurality of cores.

In the example architecture of FIG. 1, one or more storage arrays 102 provide storage services to one or more servers 116, 118 (which are referred to herein as hosts) and to one or more clients 120. The configuration will depend on the implementation of the storage array and the demand by application. Network 122 provides transport for the data exchanges between the storage array 102 and servers 116, 118 or clients 120. In addition, server 118 may be directly connected to a storage array without communicating through network 122. Storage array 102 includes one or more memory controllers 104, one or more hard disk drives (HDD) 108, and one or more solid state drives (SSD) 110, also referred to herein as flash cache. Additional examples regarding the system are provided below.

In one embodiment, the storage operating system 106 executing in the controller 104 includes a hierarchical fair CPU scheduler 124 and/or a hierarchical fair disk scheduler 126. For example, the hierarchical fair CPU scheduler 124 is configured for allocating resources (e.g., CPU cycles) when scheduling IOs. Flow scheduler instances 138 (e.g., write flow scheduler, read flow scheduler, continue flow scheduler, etc.) in the scheduler hierarchy are each configured to cross-charge costs and provide rate limiting based on the costs that are shared using a shared currency 137 as implemented by the rate limiting and cross-charging module 139. Costs are incurred when scheduling IOs accessing a portion (e.g., LUN, volume, etc.) of the data storage system 102 as implemented in the scheduler hierarchy controlling access to the data storage system 102 by a plurality of core processors of a corresponding CPU. Similarly, the hierarchical fair disk scheduler 126 is configured for cross-charging costs and rate limiting based on the costs when controlling disk access. In particular, flow scheduler instances 148 (e.g., write flow scheduler, read flow scheduler, continue flow scheduler, etc.) in the scheduler hierarchy are each configured to cross-charge costs and provide rate limiting based on the costs that are shared using a shared currency 147 as implemented by the rate limiting and cross-charging module 149. Costs are incurred when scheduling IOs accessing a portion (e.g., LUN, volume, etc.) of the data storage system 102 as implemented in the scheduler hierarchy controlling access to the data storage system 102 by a plurality of core processors of a corresponding CPU. In one embodiment, schedulers 124 and 126 are implemented within a quality of service (QoS) manager.

While embodiments of the present invention are described with the reference to the hierarchical fair CPU scheduler 124 to illustrate the cross-charging of costs across flow scheduler instances of one or more flows executing across one or more core processors to access a particular portion of the data storage system 102, and rate limiting based on the costs that are shared, the same principles may be applied to the hierarchical fair disk scheduler 126.

Figure 2:
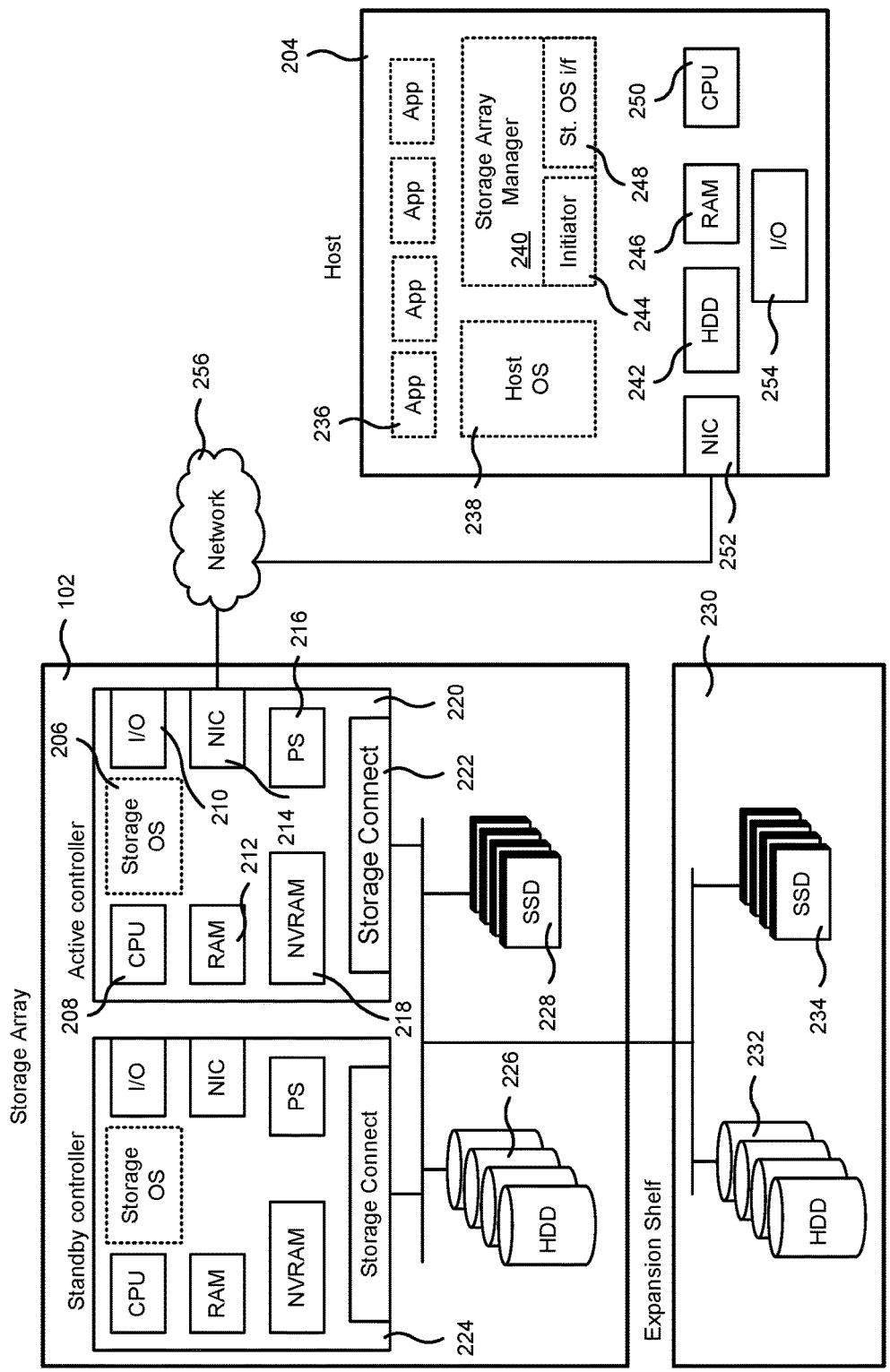
FIG. 2 illustrates the architecture of a storage array, in accordance with one embodiment of the present disclosure.

FIG. 2 illustrates an example architecture of a storage array 102, according to one embodiment. In one embodiment, storage array 102 includes an active controller 220, a standby controller 224, one or more HDDs 226, and one or more SSDs 228. It is important to note that either controller can operate in the active mode, and either controller can operate in the standby mode, such that when both controllers are on-line one controller is designated as the active controller and functions to service IOs from one or more hosts, while the other controller remains in standby mode ready to step in and handle the IOs when a failure (real or instantiated) to the active controller occurs. As such, the active controller 220 and the standby controller 224 are configured similarly and mirrored appropriately, such that either controller when designated active can access (e.g., write, read, etc.) data stored in any of the storage mediums of the storage array 102, including a corresponding NVRAM, read cache SSD 228, and HDD 226 to serve IOs from hosts. In one embodiment, the active controller 220 includes NVRAM 218, which in one implementation is used for immediately storing the incoming data (e.g., write data) as it arrives to the storage array. In that manner, storage array 102 provides immediate acknowledgment of a write request to the requesting host. After the data is processed (e.g., compressed and organized in segments (e.g., coalesced)), the data is transferred from the NVRAM 218 to HDD 226, or to read cache SSD 228 if the data is determined to be cache worthy, or to both.

The active controller 220 includes various components that enable efficient processing of read and write requests. For instance, data from a write operation is stored first in the NVRAM 218 of active controller 220, and provides for immediate acknowledgment of acceptance and storage of the data back to the host, thereby providing increased storage system performance. Because the data is later stored in HDD 226 and/or SSD 228, a later read access will retrieve the data from the location giving the quickest access. For example, the data is retrieved from NVRAM 218 for the quickest response time if the data is still available. Further description of the operations performed during write and read requests is provided in relation to FIGS. 3 and 4.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, active controller 220 is configured to perform cross-charging of costs when scheduling IOs accessing a portion of a data storage system (e.g., LUN, volume, etc.) in a scheduler hierarchy as implemented across a plurality of cores of a CPU. In one embodiment, standby controller 224 includes the same components as active controller 220.

In one embodiment, bus 290 provides connectivity between the components of the active controller 220 and the components of the standby controller 224, for example to implement an active/standby array configuration, wherein the active controller 220 services IO requests from one or more hosts and the standby controller 224 services write cache mirroring requests (e.g., mirrors writes to NVRAM 218 to NVRAM 299) while remaining ready to assume the primary responsibility of servicing IOs when a failure occurs at the active controller 220.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 102 to increase HDD 232 capacity, or SSD 234 capacity, or both.

In one embodiment, active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM 299. If the active controller 220 fails, standby controller 224 takes over the management of the storage array 102. For example, one or both of the failover managers 134 in the controllers 220 and 224 implement and/or manage the failover process. When servers, also referred to herein as hosts, connect to the storage array 102, read/write requests (e.g., IO requests) are sent over network 256, and the storage array 102 stores the sent data or sends back the requested data to host 204.

Host 204 is a computing device including a CPU 250, memory (RAM) 246, permanent storage (HDD) 242, a NIC card 252, and an IO module 254. The host 204 includes one or more applications 236 executing on CPU 250, a host operating system 238, and a computer program storage array manager 240 that provides an interface for accessing storage array 102 to applications 236. Storage array manager 240 includes an initiator 244 and a storage OS interface program 248. When an IO operation is requested by one of the applications 236, the initiator 244 establishes a connection with storage array 102 in one of the supported formats (e.g., iSCSI, Fibre Channel, or any other protocol). The storage OS interface 248 provides console capabilities for managing the storage array 102 by communicating with the active controller 220 and the storage OS 206 executing therein.

To process IO requests, resources from the storage array 102 are required. Some of these resources may be a bottleneck in the processing of storage requests because the resources are over utilized, or are slow, or for any other reason. In general, the CPU and the hard drives of the storage array 102 can become over-utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests, the SSD cache, which is a fast responding system may press the CPU for cycles, thus causing potential bottlenecks for other requested IOs or for processing background operations. The hard disks may also become a bottleneck because the inherent access speed to data is slow when compared to accessing data from emery (e.g., NVRAM) or SSD 228. Embodiments of the present invention are able to reduce bottlenecks at the CPU and/or HDD, by ensuring that the CPU or disk access resources assigned to various tasks controlled by cross-charging of costs when scheduling IOs accessing a portion of a data storage system (e.g., LUN, volume, etc.) in a scheduler hierarchy as implemented across a plurality of cores, and when applying rate limits based on the cross-charged costs. This provides for efficient use of resources, thereby reducing the overall cost and use of those resources when met with a given demand.

More details are provided below regarding example elements in FIGS. 1 and 2 with reference to FIGS. 3-9. It should be understood, however, that specific implementations may utilize different modules, different protocols, different number of controllers, etc., while still being configured to execute or process operations taught and disclosed herein. As such, the example structure of FIG. 2 should not be interpreted to be exclusive or limiting, but rather exemplary or illustrative.

Figure 3:
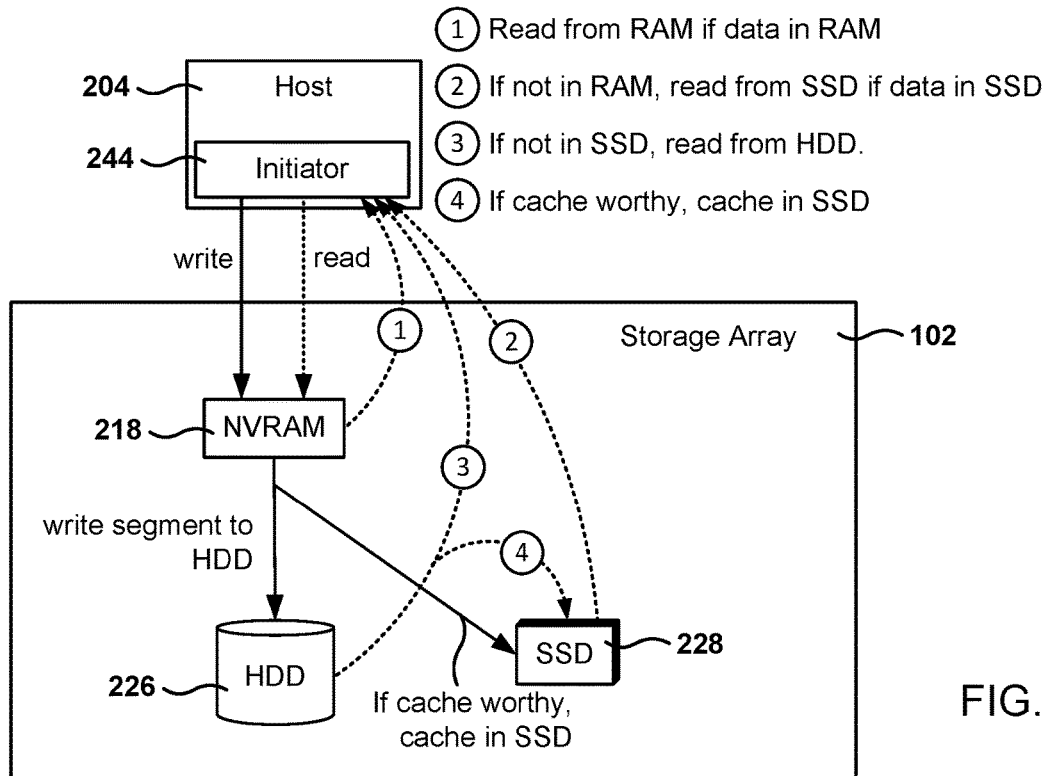
FIG. 3 illustrates read and write paths within the storage array, in accordance with one embodiment of the present disclosure.

FIG. 3 illustrates read and write paths within the storage array 102, according to one embodiment. Regarding the write path, the initiator 244 in the host 204 sends the write request to the storage array 102. As the write data comes in, the write data is written into NVRAM 218, and an acknowledgment is sent back to the initiator (e.g., the host or application making the request). In one embodiment, storage array 102 supports variable block sizes. Data blocks in the NVRAM 218 are grouped together to form a segment that includes a plurality of data blocks, which may be of different sizes. The segment is compressed and then written to HDD 226. More details are provided below regarding the transfer of data from the NVRAM 218 to HDD 226 with reference to FIG. 4. In addition, if the segment is considered to be cache-worthy (i.e., important enough to be cached or likely to be accessed again) the segment is also written to the SSD cache 228. In one embodiment, the segment is written to the SSD 228 in parallel while writing the segment to HDD 226.

In one embodiment, the performance of the write path is driven by the flushing of NVRAM 218 to disk 226. With regards to the read path, the initiator 244 sends a read request to storage array 102. The requested data may be found in any of the different levels of storage mediums of the storage array 102. First, a check is made to see if the data is found in RAM (not shown), which is a shadow memory of NVRAM 218, and if the data is found in RAM then the data is read from RAM and sent back to the initiator 244. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 228 and sent to the initiator 244. If the data is not found in the NVRAM 218 nor in the flash cache 228, then the data is read from the hard drives 226 and sent to the initiator 244. In addition, if the data being served from hard disk 226 is cache worthy, then the data is also cached in the SSD cache 228.

Figure 4:
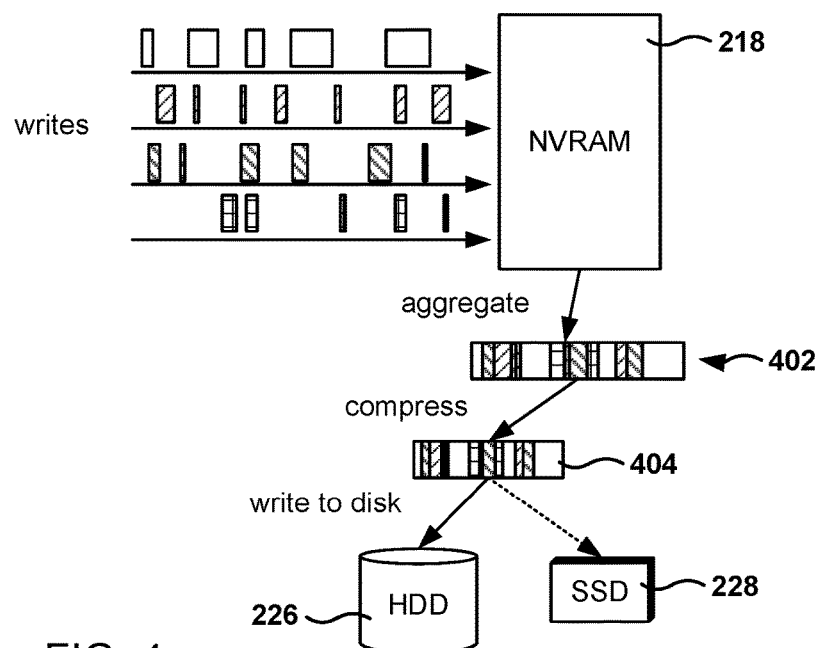
FIG. 4 illustrates the segmentation and compression of write data blocks before saving in hard disk, in accordance with one embodiment of the present disclosure.

FIG. 4 illustrates the segmentation and compression of write data blocks before saving/writing to hard disk, in accordance with one embodiment. The different blocks arrive from one or more hosts to the storage array and then the blocks are stored in NVRAM 218. The incoming blocks are then aggregated into a segment 402, by concatenating the receiving blocks as they arrive to the NVRAM. It is noted that the blocks may have different sizes in one embodiment. The segment 402 is compressed 404 before transmittal to the disk, which results in time savings for the transmittal and savings in the space utilized in the hard drives 226. As noted above, if the data is cache-worthy then the data is also written to flash cache 228. This architecture is very efficient for random writes, as the data is not sorted before being sent to the hard drives, as it is often done in other storage architectures. Here, the data is fluently captured, segmented, compressed, and then sent to the drives, which results in a fast write path for the incoming data.

Figure 5A:
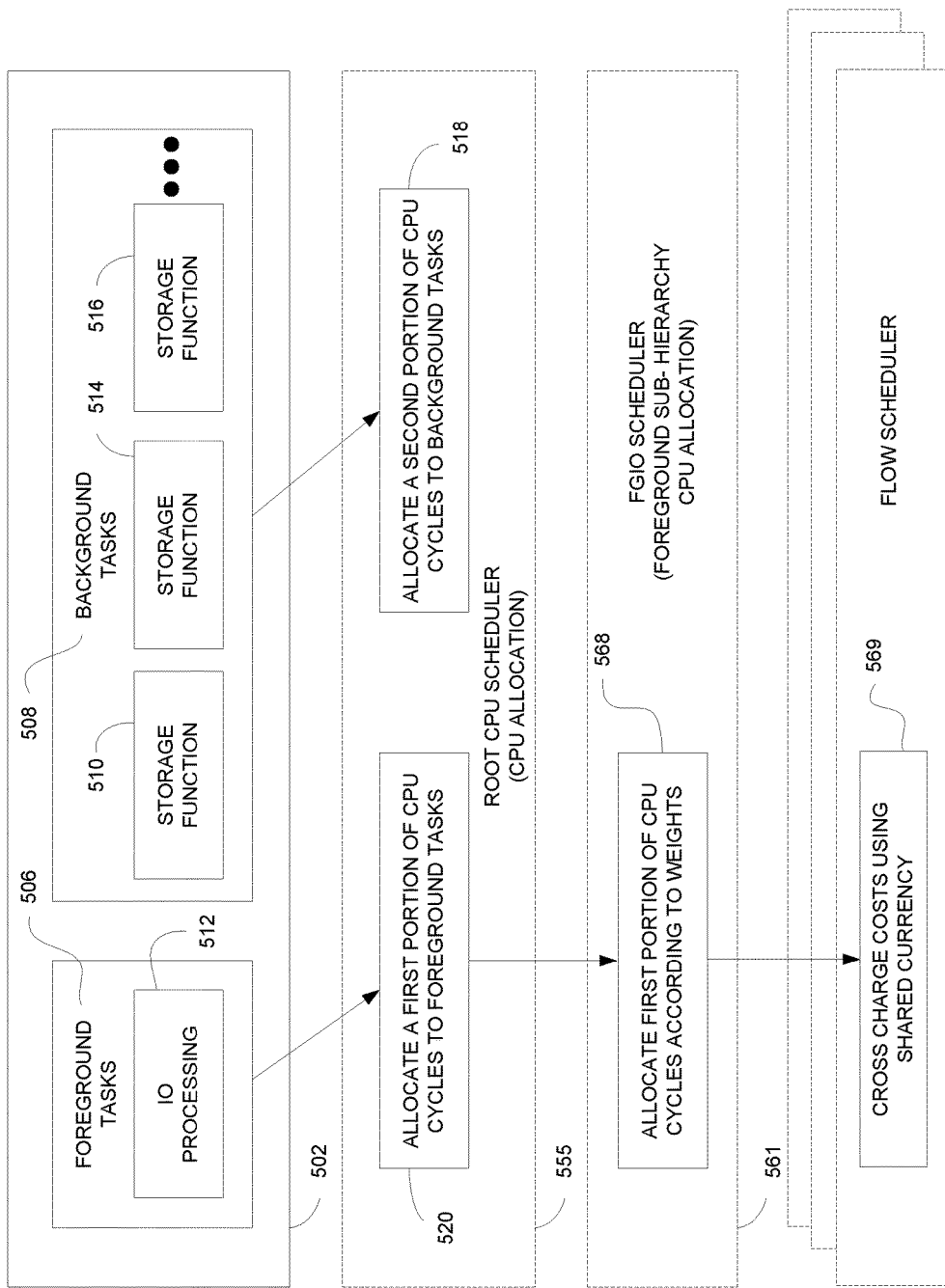
FIG. 5A illustrates the distribution of resources and corresponding charging of costs as implemented in a high level diagram of a scheduler hierarchy in a data storage system, in accordance with one embodiment of the present disclosure.

FIG. 5A illustrates resource distribution, cross-charging of costs, and rate limiting based on the costs that are shared as implemented in a high level diagram of a scheduler hierarchy in a data storage system, in accordance with one embodiment of the present disclosure. As shown, a plurality of tasks 502 performed in a data storage system includes foreground tasks 506 and background tasks 508. Foreground tasks 506 refer to the processing of IO requests 512 by one or more processors, as previously described. For example, the storage array may have a CPU with multiple core processors (e.g., 2, 4, 8, 12, 16, 20, 24, 44 cores, etc.). In one embodiment, threads are created within each CPU core for processing requests, and may be referred to as worker threads. In one implementation, one thread may be created per CPU core. In other implementations, multiple threads per CPU core may be supported. Threads are constantly running as long as requests need to be processed.

Background tasks 508 (e.g., storage function 510, storage function 514, and storage function 516, etc.) are tasks created in the storage system for general operations in the array. The background tasks may arise in response to certain events, such as consumption of a resource reaching a threshold, periodicity to ensure metadata consistency, a schedule to take a snapshot becoming ready, etc. For example, background tasks may include garbage collection of obsolete data, compaction of data (e.g., merging contents of two half-filled segments into one full segment), creating snapshots of data, backup, and replication procedures, etc.

In one embodiment, a root fair CPU scheduler 555 is configured to fairly allocate CPU cycles to foreground workloads 506 and background tasks 508. In particular, to ensure fairness between background tasks and foreground workloads, root fair CPU scheduler 555 identifies tasks waiting to be executed and allocates resources to these tasks fairly. For example, root fair CPU scheduler 555 performs operations to allocate a first portion of CPU cycles to foreground tasks at block 520, and performs operations to allocate a second portion of CPU cycles to background tasks at block 518. In that manner, static distribution of resources is achieved between foreground tasks and background tasks. In addition, fairness in resource allocation means that any single background task or foreground IO processing cannot dominate CPU utilization. As such, any single foreground workload cannot dominate with regards to receiving input/output per second (IOPS) or MBPS from the data storage system. In one embodiment, fairness enables proper assignment of resources in terms of allocating CPU cycles. In another embodiment, fairness enables proper assignment of resources in terms of data consumption, where the data consumption may be measured as megabytes accessed or megabytes per second (MBPS) as delivered by the different workloads.

In addition, a foreground input/output (FGIO) scheduler 561 is configured to fairly allocate the first portion of CPU cycles that are assigned to foreground workloads (e.g., tasks) throughout a scheduler sub-hierarchy of a data storage system, wherein the sub-hierarchy includes the FGIO scheduler and its descendent schedulers, such as flow schedulers 570, 580 . . . 590. Further, each of the individual flow schedulers is configured to schedule tasks including IOs, wherein each flow on a corresponding core processor accesses a particular portion of the storage array 102 (e.g., LUN, volume, etc.). Multiple flows configured for accessing a particular portion (e.g., LUN, volume, etc.) are each associated with its own schedulers (e.g., read flow scheduler, write flow scheduler, etc.). Moreover, flow schedulers across all the flows configured for accessing a particular portion (e.g., LUN, volume, etc.) account for all IOs scheduled by all of them at a single, common place so that each instance of any flow scheduler has a view of costs incurred by other instances of any flow scheduler. This is achieved by cross-charging costs across all the flow schedulers of all the flows using a shared currency, as will be further described below.

Figure 5B:
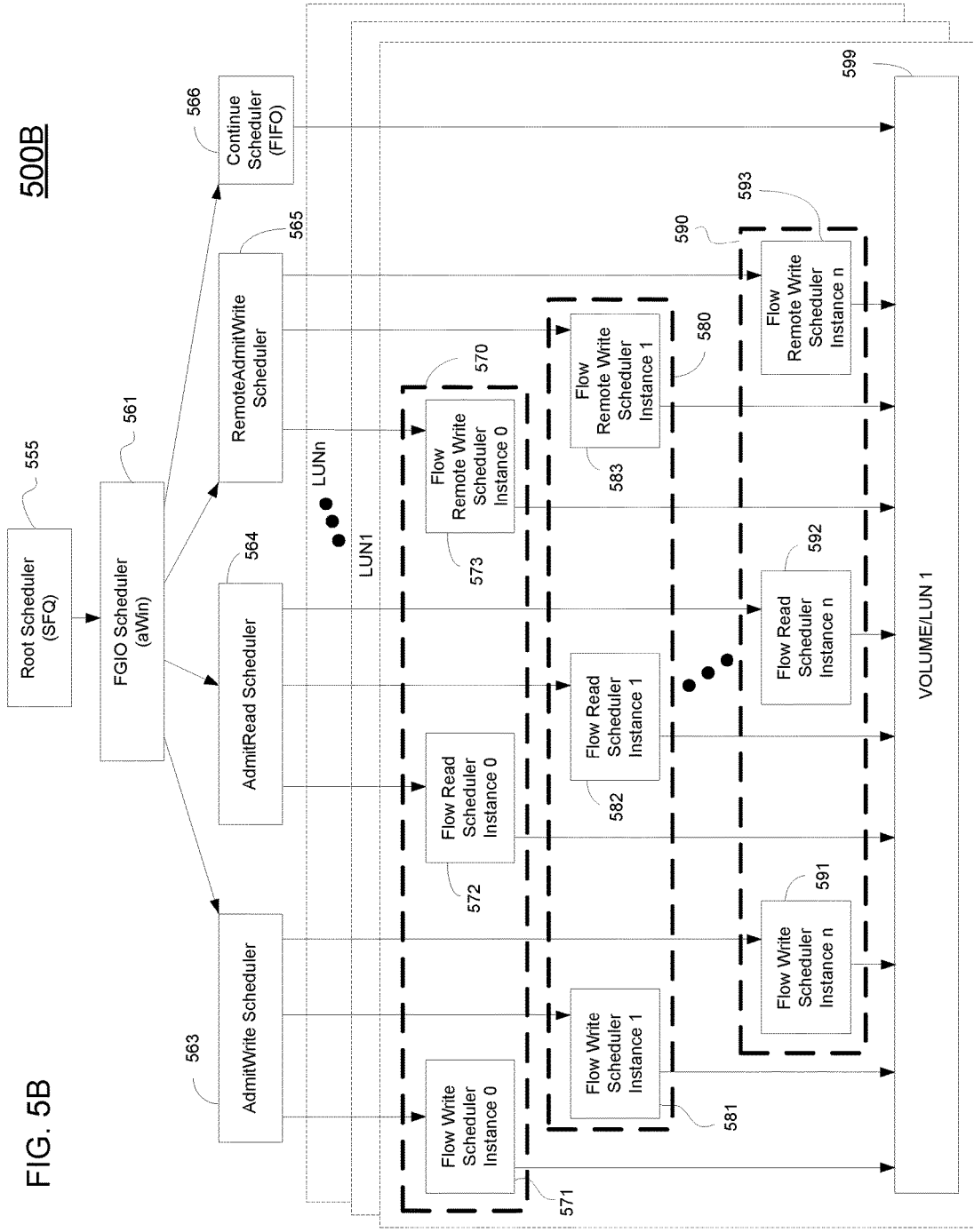
FIG. 5B is a block diagram of flow schedulers of a flow that provides access to a portion of a data storage system (e.g., LUN, volume, etc.), wherein the flow schedulers are configured for cross-charging costs incurred when scheduling operations across the various flow schedulers, in order to provide rate limiting across the various flows controlling access to the portion of the data storage system, in accordance with one embodiment of the present disclosure.

FIG. 5B illustrates a detailed diagram of a universal scheduler hierarchy 500B in a data storage system configured to perform cross-charging of costs when scheduling IOs to a particular portion of a data storage system 102, and providing rate limiting for that particular portion based on the costs that are shared. For clarity and illustration, the particular portion of the data storage system 102 is referenced as a virtual LUN throughout the application, though it may be a volume, or any other virtual partition. The universal scheduler hierarchy 500B includes a root CPU scheduler 555, and a foreground (FGIO) flow scheduler 561.

Schedulers in the hierarchy 500B know about the relative importance of tasks to be performed, including configured user parameters regarding priority/importance for allocation. A CPU scheduling system including the hierarchy of schedulers 500B, wherein schedulers in the system operate cooperatively at different levels. For example, the CPU scheduling system determines the order in which tasks are processed (i.e., assigned CPU time) and how much CPU resources (e.g., CPU cycles) are allocated to the tasks.

In one embodiment, each scheduler in the hierarchy 500B operates on one or more schedulable entities, wherein entities are any IO request (e.g., for performing IOs) or any work request (e.g., for performing background tasks). Maintaining multiple levels of schedulers enables achieving fairness in multiple dimensions, such as foreground task versus background tasks, controlling access to hard disk by different applications, etc. The objective of the universal scheduler hierarchy 500B is to select the most eligible IO or work request that is waiting for a resource (e.g., a queued task) and allocate the resource to the request. The overall goals of the scheduling system are to obtain fairness among the different tasks in the storage array, and to provide controls to the user for assigning priorities to different tasks, and to flows of foreground flow processing.

In addition, the scheduling of IOs may be controlled through the cross-charging of costs that are scheduled by flow scheduler instances of one or more flows executing on one or more core processors, wherein the flows are scheduling IOs to a particular virtual LUN of the data storage system 102 (e.g., LUN, volume, etc.). In that manner, each instance of any flow scheduler instance has a view of the costs incurred by other instances of any other flow scheduler. Further, the shared costs provides for cooperatively rate limiting the admission of IOs by flow scheduler instances accessing the same portion of the data storage system 102.

As shown in FIG. 5B, at the root is the CPU scheduler, also referred to herein as the root scheduler 555. For example, the root scheduler 555 is configured to allocate CPU resources to the different tasks, foreground or background, based on various factors including the amount of CPU cycles, or any other metric related to CPU consumption utilized during execution of the different tasks. As such, the root scheduler 555 selects a task and allocates CPU resources to execute that task throughout the universal hierarchy 500B. That is, root scheduler 555 is configured to allocate CPU resources between the foreground and background tasks, as previously described in FIG. 5A. That is, the root scheduler 555 allocates CPU cycles to foreground tasks that are scheduled by the FGIO flow scheduler 561, and to background tasks that are scheduled by a miscellaneous scheduler (not shown) and/or the garbage collection scheduler (not shown). For example, background tasks include garbage collection of obsolete data, compaction of data (e.g., merging contents of two half-filled segments into one full segment), creating snapshots of data, backup, and replication procedures, etc. In particular, a first portion of CPU resources is assigned to foreground tasks, and a second portion of CPU cycles is assigned to background tasks (e.g., garbage collection, NVRAM flush, replication, etc. As such, a fair distribution of resources is achieved between foreground tasks and background tasks.

In embodiments, there are other schedulers below the root scheduler 555. For example, there may be a sub-hierarchy of schedulers 559 that is configured for handling foreground tasks. Not all schedulers are shown for simplicity and clarity when disclosing embodiments of the present invention that provide for cross-charging of costs by schedulers under the FGIO scheduler 561 when scheduling IOs to a particular portion of a data storage system 102, and providing rate limiting for that particular portion based on the costs that are shared. For example, there may be the previously described miscellaneous scheduler (e.g., first-in-first-out [FIFO]) and a garbage collection (GC) scheduler (e.g., FIFO). As such, once the resources have been allocated to the various flow scheduler instances of flows, executing across one or more core processors, controlling access to a particular portion of a data storage system 102 (e.g., LUN, volume, etc.), cross-charging of costs is implemented for use in resource allocation, and for rate limiting admissions to that particular portion of the data storage system 102.

The FGIO scheduler 561 selects which flow is to be served next amongst all the LUN flows accessing the various portions of the data storage system 102 (e.g., LUNs, volumes, etc.). A LUN flow may represent a set of foreground IOs belonging to a virtual LUN, wherein the LUN is a unique identifier given to devices for purposes of access using various communication protocols, or a volume, or any other partition of the data storage system 102. As such, FGIO scheduler 561 may serve LUN flows in a calculated order to achieve fairness, such as serving a first LUN flow for a first LUN, then serving a tenth LUN flow for a tenth LUN, then serving an nth LUN flow for an nth LUN, wherein the LUNs are in no particular order.

In particular, foreground flow FGIO scheduler 561 is configured for receiving an allocated amount of CPU resources from the root scheduler 555 for use in handling foreground tasks, and for fairly allocating those resources throughout the scheduler sub-hierarchy. For example, resource allocation may be achieved using accumulating weights. The FGIO scheduler 561 creates four schedulers, including write admit scheduler 563 (referred to as AdmitWrite scheduler), admit read scheduler 564 (also referred to as AdmitRead scheduler), remote write admit scheduler 565 (also referred to as RemoteAdmitWrite scheduler), and continue scheduler 566, each of which is configured for allocating CPU resources to handle IOs directed at one or more virtual LUNs to be executed across one or more core processors. In particular, the AdmitWrite scheduler 563 is configured to achieve admission control (e.g., through queuing) of local write, write same, unmap, and ATS IOs that are not yet admitted into the data storage system. The AdmitRead scheduler 564 is configured to schedule read IOs (e.g., through queueing) that are not yet admitted into the system. That is, the AdmitRead scheduler 564 is configured to achieve admission control for read IOs in the system. RemoteAdmitWrite scheduler 564 is configured to achieve admission control (e.g., queue) over remote write, write same, unmap, and ATS IOs that are not yet admitted into the data storage system. Continue scheduler 566 is configured to queue previously admitted IOs.

Each of the AdmitWrite 563, AdmitRead scheduler 564, RemoteAdmitWrite scheduler 565, and Continue scheduler 566 is configured to allocate resources to the various core flows accessing the various virtual LUNs of the data storage system 102, as shown in FIG. 5B. That is, these schedulers 563-566 allocate and schedule resources to handle IOs directed to one or more (e.g., LUNs 0-n) as executed by a plurality of core processors. In one embodiment, each of these schedulers 563-566 schedule IOs and/or allocate resources across all of the underlying flow schedulers of the various core processors for the plurality of LUNs. For example, AdmitWrite scheduler 563 allocates resources for handling IOs directed to one or more LUNs, and more particularly allocates resources across one or more core flows, wherein each core flow allocates resources and/or schedule IOs to a corresponding LUN, and wherein each core flow is associated with a core processor, and includes one or more of the following: flow write scheduler instance, a flow read scheduler instance, a flow remote write scheduler instance, and a flow continue scheduler instance. For a corresponding LUN, there may be multiple core flows scheduling IOs across multiple core processors.

AdmitWrite scheduler 563 selects which core flow and corresponding flow write scheduler instance is to be served next amongst the core flows accessing LUN0. Simultaneously, AdmitWrite scheduler 563 is also configured to select which core flow and a corresponding flow write scheduler instance is to be served next amongst the core flows accessing other LUNs, such as LUN1 . . . LUNn. In addition, AdmitRead scheduler 564 selects which core flow and a corresponding read scheduler instance is to be served next amongst the core flows accessing LUN0, and simultaneously is also configured to select which core flow is to be served next amongst the core flows accessing other LUNs. Similarly, RemoteAdmitWrite scheduler 565 selects which core flow and corresponding flow remote write scheduler instance, and simultaneously is also configured to select which core flow is to be served next amongst the core flows accessing other LUNs.

In one embodiment, the continue scheduler 566 is not subjected to cross-charging, and as such is not associated with any core flows. That is, the continue scheduler 566 directly schedules its continue operations with each LUN.

Prominently shown, one or more core flows are shown and are configured for scheduling and/or admitting IOs to LUN0. For example, core flow 570 is associated with a core processor (e.g., core-0 amongst core processors 0-n), and includes a flow write scheduler instance 0, a flow read scheduler instance 0, and a flow remote write scheduler instance 0. Core flow 580 is associated with a core processor (e.g., core-1), and includes a flow write scheduler instance 1, a flow read scheduler instance 1, and a flow remote write scheduler instance 1. For the nth core processor, core flow 590 includes a flow write scheduler instance n, a flow read scheduler instance n, and a flow remote write scheduler instance n. For illustration, when handling write IOs directed to LUN 0, AdmitWrite scheduler 563 schedules write IOs across the various flow write scheduler instances 0-n across the various core processors 0-n. Also, when handling read IOs directed to LUN 0, AdmitRead scheduler 564 schedules read IOs across the various flow read scheduler instances 0-n across the various core processors 0-n. Further, when handling remote write IOs directed to LUN 0, RemoteAdmitWrite scheduler 565 schedules remote write IOs across the various flow remote write scheduler instances 0-n across the various core processors 0-n. Similar scheduling is performed for the other LUNs 1-n.

Though not shown, one or more folders may be included in the scheduler hierarchy 500B, wherein each folder may be associated with a particular LUN. Each folder is used to allocate resources across all the core flows accessing a corresponding LUN. For example, there may be one or more write folders under the AdmitWrite scheduler 563, in embodiments. In the case where there is a folder for each of LUNs 0-n, there are n+1 folders, such that write folder 0 allocates resources to the various flow write scheduler instances across the various core processors used for executing IOs accessing LUN 0, write folder 1 allocates resources to flow write scheduler instances accessing LUN 1, etc. In other embodiments, there may not be a folder corresponding to every LUN, such that some LUNs may have a corresponding folder, but other LUNs may not have a corresponding folder, in which case, the overlying scheduler 563-566 handles the allocation of resources to the core flows used to access LUNs without folders, such as in the case shown in FIG. 5B. When using folders, a LUN folder flow may correspond to a particular LUN, and include an admit write folder, an admit read folder, an admit remote write folder, and a continue folder. In another embodiment, each folder supports one or more LUNs. Schedulers are added to folders to set and define certain parameters, in one implementation. For example, the folder scheduler is able to set limits for the folder, such as megabytes per second (MBPS), IOs per second (IOPS), etc. In another embodiment, a folder includes one or more of LUNs (and/or volumes) and folders in combination.

Figure 6:
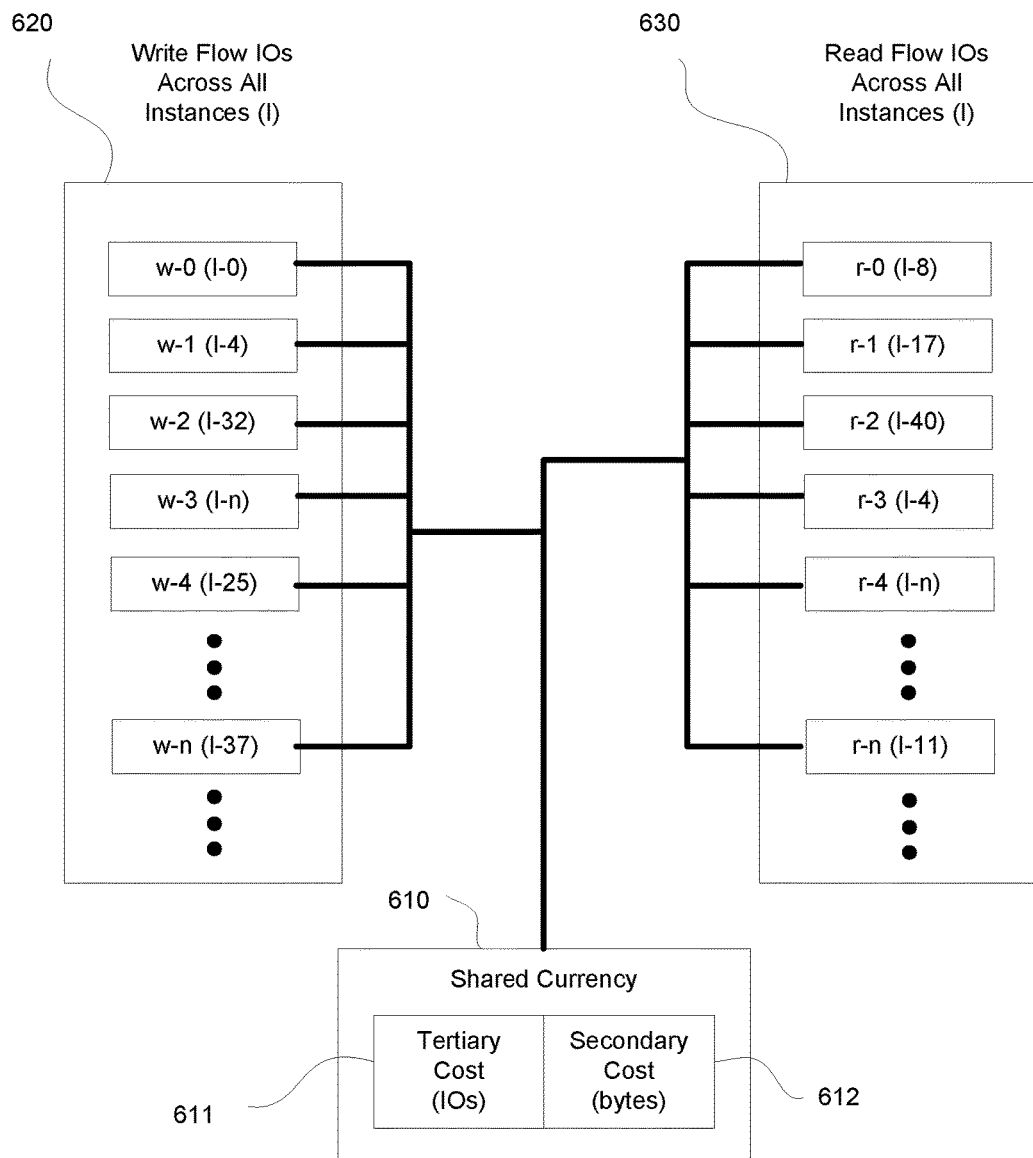
FIG. 6 is a diagram showing shared currency of IOs scheduled by flow schedulers controlling access to a particular, defined portion (e.g., LUN, volume, etc.) of a storage system, in accordance with one embodiment of the present disclosure.

FIG. 6 is a diagram showing shared currency of IOs scheduled by flow schedulers controlling access to a single, virtual LUN of a storage system, in accordance with one embodiment of the present disclosure. Cross-charging of costs is performed when executing operations across the various flow schedulers scheduling IOs to a particular virtual LUN, for example in order to fairly schedule operations across the flow schedulers, and/or to provide rate limiting for that LUN. In particular, a CPU awareness problem exists when flow schedulers (e.g., flow write, flow read, and/or flow remote write) act independently from each other.

For instance, a core flow could be responsible for serving both, read and write operations, and a core flow servicing both reads and writes may receive a higher CPU share than another core flow servicing only reads, or another core flow servicing only writes, even though the number of operations being serviced may be approximately equal. This situation arises especially when reads and writes are charged independently of each other, such as when a core flow has two separate flow scheduler queues (e.g., one for read and one for write) that are each unaware of costs incurred in the opposite scheduler. In addition, rate limiting the LUN across all the core flows scheduling IOs for that LUN is difficult when the queues act independently of each other and at any given point of time, since no queue has the knowledge of number of IOs being served by other queues.

In one embodiment, flow schedulers and their instances belonging to the same LUN can account for all IOs scheduled by those instances at a single, common place (global cost), wherein a cost is the amount of resources (CPU cycles) consumed by a schedulable entity (e.g., scheduler instance, schedulers for a flow, etc.) for every operation. In that manner, each instance of any flow scheduler has a view of the costs incurred by other instances of any other flow scheduler. In particular, the global cost is shared between instances of different flow schedulers using global cost synchronization.

As such, each flow scheduler (e.g., flow write, flow read, flow remote write, continue) and its corresponding queue is made aware of the costs incurred in other flow schedulers corresponding a particular LUN by cross-charging a cost incurred by one flow scheduler across all flow schedulers. Specifically, all IOs scheduled by all queues (corresponding to the flow schedulers, such as those belonging to a LUN flow) are accounted for at a single, common location using a shared currency that accumulates through a cross-charging of costs. In that manner, each instance of any flow scheduler and its corresponding queue has a view of the costs incurred by other instances of flow schedulers scheduling IOs for that LUN. Further, rate limiting can be performed across all the flow schedulers scheduling IOs for that LUN, such as across flow schedulers for the LUN flow.

As shown in FIG. 6, a shared currency 610 is established and configured to accumulate costs incurred across all flow schedulers that are scheduling IOs to a particular LUN. For example, the costs may be the number of IOs being handled for that LUN, in which case a tertiary cost 611 is used for accumulating that cost (the number of IOs). The costs may be the number of bytes being handled for that LUN, in which case a secondary cost 612 is used for accumulating that cost (the number of bytes). Both of these costs may be accumulated independently of each other. Further, rate limiting of the LUN based on either of the shared currencies may be performed independently. That is, rate limiting for the LUN may be performed based on the tertiary cost 611, and independently rate limiting may be performed based on the secondary cost 612. As such, if either of the tertiary cost 611 or the secondary cost 612 exceeds its rate limit, admission of IOs across all flow schedulers admitting IOs for that LUN is suspended for a period of time. In addition to secondary costs 612 and tertiary costs 611, the flow schedulers may be configured within a scheduling hierarchy that uses one or more primary costs that are configured for fair scheduling of IOs between the flow schedulers.

In particular, a plurality of write IOs (e.g., w-0 . . . w-n) 620 is scheduled across a plurality of flow write scheduler instances 0-n (e.g., corresponding to core processors 0-n), each of which is configured for scheduling write IOs to a particular LUN. For example, the scheduled write IOs are ordered, and may include simultaneous scheduling of write IOs at a particular clock cycle. As shown, w-0 is scheduled by flow write scheduler instance I-0, which may be scheduling write IOs for execution on core processor 0. In addition, w-1 is scheduled by flow write scheduler instance I-4 for execution on core processor 4, w-2 is scheduled by flow write scheduler instance I-32 for execution on core processor 32, w-3 is scheduled by flow write scheduler instance I-n for execution on core processor n, w-4 is scheduled by flow write scheduler instance I-24 for execution on core processor 24, . . . and w-n is scheduled by flow write scheduler instance I-37 for execution on core processor 37. The scheduling of write IOs continues thereafter.

Simultaneous to the scheduling of write IOs described above, a plurality of read IOs (e.g., r-0 . . . r-n) 630 is scheduled across a plurality of flow read scheduler instances 0-n (e.g., corresponding to core processors 0-n), each of which is configured for scheduling read IOs to the same LUN described above. For example, the scheduled read IOs are ordered, and may include simultaneous scheduling of read IOs at a particular clock cycle. As shown, r-0 is scheduled by flow read scheduler instance I-8, which may be scheduling read IOs for execution on core processor 8. In addition, r-1 is scheduled by flow read scheduler instance I-17 for execution on core processor 17, r-2 is scheduled by flow read scheduler instance I-40 for execution on core processor 40, r-3 is scheduled by flow read scheduler instance I-4 for execution on core processor 4, r-4 is scheduled by flow read scheduler instance I-n for execution on core processor n, . . . and r-n is scheduled by flow read scheduler instance I-11 for execution on core processor 11. The scheduling of read IOs continues thereafter.

Figure 7:
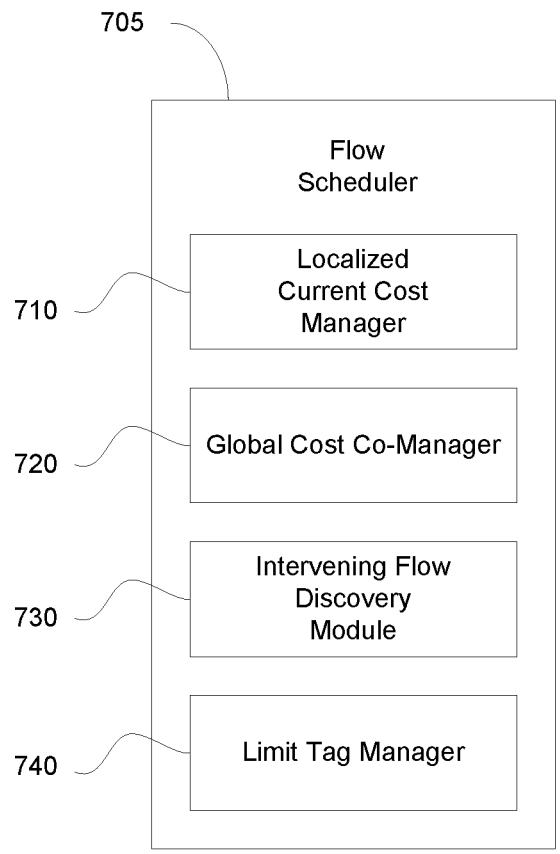
FIG. 7 is a block diagram of a flow scheduler of a flow, wherein the flow scheduler provides access to a defined portion of a data storage system (e.g., LUN, volume, etc.) and is configured for cross-charging costs incurred when executing IOs to the various flow schedulers of all flows corresponding to a plurality of core processors that are accessing the same defined portion of the data storage system, in accordance with one embodiment of the present disclosure.

FIG. 7 is a block diagram of a flow scheduler 705 of a corresponding core flow, in accordance with one embodiment of the present disclosure. The flow scheduler 705 may be one of a flow write scheduler, flow read scheduler, flow remote write scheduler, or continue scheduler that is configured for scheduling IOs for execution on a particular core processor. In particular, flow scheduler 705 provides access (e.g., schedules IOs) to a corresponding virtual LUN, and more particularly is configured for cross-charging costs incurred to a shared currency, such that the shared currency reflects the costs of scheduling all IOs across the various flow schedulers of all flows corresponding to the LUN. Flow scheduler 705 is implemented within storage array 102 of FIG. 1, and more particularly within the controller 104 that includes an operating system 106 that is configured to process IO requests.

For example, to implement cross-charging of costs across the various flow schedulers scheduling IOs for a particular virtual LUN, flow scheduler 705 includes a localized current cost manager 710 that is configured to manage and/or maintain a local cost for performing IOs. The current cost manager 710 is configured to discover the costs incurred by other flow schedulers scheduling IOs for that LUN, and account for those costs as well as internal costs in its localized current cost. In that manner, each flow scheduler scheduling IOs for the LUN is aware of the costs incurred by all the flow schedulers (e.g., flow write, flow read, flow remote write, flow continue) by using the shared currency, in one embodiment. In other embodiments, the shared currency reflects costs for selected flow schedulers, such as any combination of one or more of the following: flow write schedulers, flow read schedulers, flow remote write schedulers, and flow continue schedulers.

Flow scheduler 705 includes a global cost co-manager 720 that is configured to manage and/or maintain a global cost (e.g., variable and/or value) for processing IOs across all the flow schedulers scheduling IOs for a particular LUN. The global cost is one of the shared currencies, such as a tertiary cost (accounting for IOs) and a secondary cost (accounting for bytes). The global cost co-manager 720 is configured to update the global cost when scheduling a corresponding IO.

Further, to cross-charge costs across the various flow schedulers, flow scheduler 705 includes an intervening flow discovery module 730 configured to discover one or more intervening IOs scheduled by the other flow schedulers, wherein the intervening operations were scheduled between the last scheduled IO by flow scheduler 705, and the currently scheduled IO by flow scheduler 705. In particular, flow scheduler 705 is configured to determine the cost of the intervening operations based on states of the global cost and/or the current cost.

In addition, rate limiting is possible for the particular LUN because each flow scheduler is aware of the costs incurred by all the other flow schedulers that are scheduling IOs for that LUN by using the global cost (e.g., shared currency). In one embodiment, rate limiting for the LUN is performed at the local level, such as at each flow scheduler, since each flow scheduler is aware of costs incurred by all the flow schedulers. In that manner, when one flow scheduler reaches a defined limit rate (IOs or bytes for that LUN), then other flow schedulers will also reach the limit rate when scheduling its next IO because all the costs for the LUN are considered.

Figure 8A:
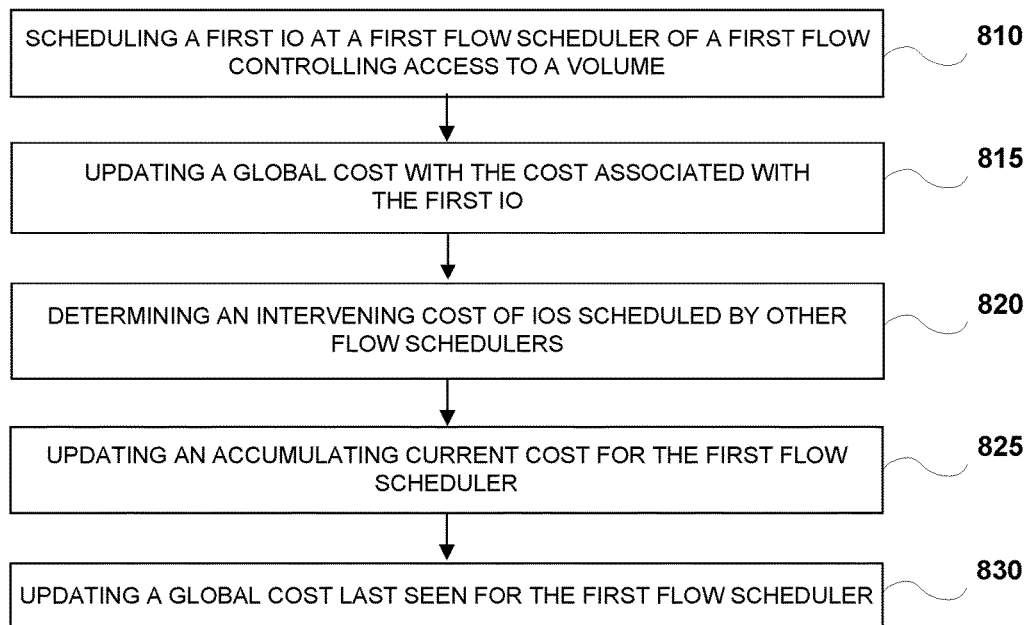
FIG. 8A is a flow diagram illustrating a method for cross-charging costs of scheduled IOs across various flow schedulers of a plurality of flows of a plurality of core processors, wherein the flows control access to a portion of a data storage system (e.g., LUN, volume, etc.) by cross-charging costs incurred when executing operations across the various flow schedulers, in accordance with one embodiment of the present disclosure.

FIG. 8A is a flow diagram 800 illustrating a method for cross-charging costs of scheduled IOs scheduled across various flow schedulers of a plurality of flows of a plurality of core processors, wherein the flows control access to a virtual LUN by cross-charging costs incurred when executing operations across the various flow schedulers, in accordance with one embodiment of the present disclosure. In one embodiment, flow diagram 800A is implemented within controller 104, and flow scheduler instances of FIGS. 5A-5B and 7.

In FIG. 8A, flow diagram 800A is implemented to determine a localized current cost and a global cost for flow scheduler instances (e.g., flow write scheduler instance, flow read scheduler instance, flow remote write scheduler instance) scheduling IOs for a particular LUN. The flow scheduler instances may correspond to one or more core processors of a multi-core environment. In that manner, operations can be fairly scheduled across the LUN by the particular scheduler instances by using the localized current costs and the global cost.

At 810, the method includes scheduling a first IO from a first queue of a first flow scheduler of a first flow. For example, the first flow may include a write flow scheduler and a read flow scheduler. The first flow allocates resources to a particular LUN when scheduling IOs executed by a first core processor. The first IO has a first cost (e.g., number of bytes consumed, an IO count, etc.). In addition the first flow scheduler has a first current cost that is localized. The current cost represents the amount of resources (e.g., CPU cycles) consumed by the first flow scheduler (e.g., scheduling write or read IOs). In embodiments, the first current cost also takes into account the costs consumed by other flow schedulers across the various flows scheduling IOs for that LUN.

At 815, an accumulating global cost is defined that accounts for all costs incurred when scheduling IOs across the one or more flow schedulers of the one or more flows scheduling IOs for that LUN. In particular, the global cost is updated with the first cost associated with the first IO. The global cost is shared by all the flow schedulers of a plurality of core flows of a plurality of core processors of a CPU as previously described, and as such reflects all the cost incurred by those flow scheduler instances.

In embodiments, the global cost is a shared currency used to achieve global cost synchronization. That is, the global cost may be a secondary cost used to account for bytes consumed by all the flow schedulers. The global cost may be a tertiary cost used to account for the number of IOs admitted by all the flow schedulers. Both the secondary cost and the tertiary cost are shared across all the flow schedulers and may be tracked independently. The continue flow scheduler does not have a notion of shared primary cost, and does not use global cost synchronization.

At 820, the method includes determining an intervening cost of IOs possibly scheduled by other core flow schedulers for execution on the plurality of core processors. The intervening cost is determined based on known states of the global cost and the localized current cost (which is equal to the global cost last seen by the first flow scheduler when scheduling its last, previously scheduled IO). For example, one or more intervening IOs may have been scheduled by other flow schedulers before the scheduling of the first IO, and after any previously scheduled IO by the first flow scheduler. For example, a plurality of intervening read and/or write operations may have been scheduled by one or more flow read scheduler instances and one or more flow write scheduler instances before the first IO is scheduled by the first flow scheduler, and after the last, previously scheduled IO by the first flow scheduler. These one or more intervening operations have an intervening cost.

The intervening cost is determined based on known states of the global cost associated with the last, previously scheduled IO by the first flow scheduler (referred to as "global cost last seen"), and also associated with the global cost that is updated with the currently scheduled first IO by the first flow scheduler. That is, the difference is determined between a previously known state for the global cost associated with the last, previously scheduled IO (after updating) of the first flow scheduler, and the known updated state of the global cost associated with the currently scheduled first IO, wherein the difference defines the intervening cost.

At 825, the method includes updating an accumulating current cost for the first flow scheduler based on the first cost and the intervening cost. In particular, the localized current cost takes into account the costs of all the other flow schedulers. For example, after updating, the accumulating current cost matches the updated global cost at this particular point in time. This occurs at each updating of a corresponding current cost, such that the previously known state for the current cost (e.g., associated with the last, previously scheduled IO by the first flow scheduler) is updated with the intervening cost.

At 830, the method includes updating a global cost last seen for the first flow scheduler. The global cost last seen matches the updated global cost that takes into account the first cost of the first IO currently scheduled, and is used for determining any intervening costs for any future IO scheduled by this first flow scheduler.

Although the method outlined in FIG. 8A is described in relation to an IO being scheduled, other embodiments are well suited to applying the method of FIG. 8A when scheduling one or more IOs.

Figure 8B:
FIG. 8B is a state diagram of local and global costs associated with exemplary flow schedulers of multiple flows controlling access to a portion of a data storage system (e.g., LUN, volume, etc.) when cross-charging the costs of IOs scheduled across the various flow schedulers, in accordance with one embodiment of the present disclosure.

FIG. 8B is a state diagram 800B of local and global costs associated with exemplary flow schedulers of multiple flows controlling access to a virtual LUN when cross-charging the costs of IOs scheduled across the various flow schedulers associated with a plurality of core processors of a CPU, in accordance with one embodiment of the present disclosure. FIG. 8B is used to illustrate the operations of the flow diagram 800A of FIG. 8A, wherein operations briefly include: 1) select an IO and update a global cost with the IO cost; 2) update the current cost based on the IO cost and any intervening costs of intervening IOs possibly scheduled by other flow schedulers; and 3) update the global cost last seen.

In particular, FIG. 8B shows states of various accumulating costs associated with a first flow scheduler instance (e.g., instance 0) and a second flow scheduler instance (e.g., instance 1) used to schedule IOs for a particular LUN. Though only two scheduler instances are shown, embodiments of the present invention are able to account for costs incurred across one or more scheduler instances associated with one or more core flows operating across one or more core processors. For example, scheduler instance 0 and scheduler instance 1 may be one of at least a flow write scheduler and a flow read scheduler. As shown, each of the flow scheduler instances 0 and 1 maintains its own local values for global cost last seen and current cost independently of values for any other flow schedulers.

These locally determined costs are cross-charged between flow schedulers using the shared global cost 850 (referred to as "GC"), which represents the shared currency that is shared by each of the flow scheduler instances 0 and 1. For example, the global cost 850 may be a tertiary cost accounting for IOs admitted by the flow schedulers, or a secondary cost accounting for bytes consumed by the flow schedulers.

Local costs shown for a corresponding flow scheduler instance include a global cost last seen 840 (referred to as "GCLS") and a current cost 845 (referred to as "CC"). The GCLS 840 and the CC 845 are both associated with the currently scheduled IO for a corresponding flow scheduler instance. As previously described, GCLS 840 associated with the currently scheduled IO is defined by the global cost that is updated by the currently scheduled IO or set of IOs. In addition, the current cost $CC_n$ 845 is determined based on the previous $CC_{n-1}$ 845 associated with the last, previously scheduled IO for the corresponding flow scheduler, and an intervening cost, wherein the intervening cost is based on the updated $GC_n$, and the previous $GCLS_{n-1}$. For example, CC 845 is defined by the following equation 1:

$$CC_n = CC_{n-1} + (GC_n - GCLS_{n-1}) \tag{1}$$

Portions of equation 1 provides for determining the intervening cost, in one embodiment. Other embodiments provide for other equations for determining the intervening cost using the same or other states for GC and/or GCLS and/or CC.

In FIG. 8B, a state for applicable costs are shown at clock time t-0, where an IO (e.g., IO-A) is scheduled by flow scheduler instance 0, wherein IO-A has a cost of value "a". Following flow diagram 800A, the global cost GC 850 is updated with the cost of IO-A to a value of "0+a" in block 865, wherein the initial value of GC 850 was of value 0. Next, the current cost $CC_n$ 845 is determined. Because there are no intervening costs of intervening IOs, $CC_n$ 845 is determined to be "a" in block 862. Next, the global cost last seen $GCLS_n$ is updated in block 861 to match the updated GC 850 in block 865, such that $GCLS_n$ is of value "a". Non-initialized null values are set for $GCLS_n$ 840 in block 863 and $CC_n$ 845 in block 864 for flow scheduler instance 1. It is important to note that these values are used for illustration only, and the states of cost shown in FIG. 8B when implementing the flow diagram of FIG. 8A may have other non-initialized values at time t-0.

Moving on to clock time t-1, states for applicable costs are shown, wherein an IO (e.g., IO-B) is scheduled by flow scheduler instance 1, wherein IO-B has a cost of value "b". Following flow diagram 800A, the global cost GC 850 is updated with the cost of IO-B to a value of "0+a+b" in block 875. Note the representative counter for the current transaction resets, such that any current value always is associated with subscript "n". As such, next the current cost $CC_n$ 845 is determined. After determining any intervening cost based on the difference between $GC_n$ and $GCLS_{n-1}$, $CC_n$ is determined to have a value of (a+b) in block 874. Next, the global cost last seen $GCLS_n$ is updated to match the updated GC 850 in block 875, such that $GCLS_n$ is of value "a+b" in block 873. The values for the flow scheduler instance 0 in blocks 871 and 872 remain the same as in blocks 861 and 862 for clock time t-0.

Moving on to clock time t-2, states for applicable costs are shown, wherein an IO (e.g., IO-C) is scheduled by flow scheduler instance 0, wherein IO-C has a cost of value "c". Following flow diagram 800A, the global cost GC 850 is updated with the cost of IO-C to a value of "0+a+b+c" in block 885. Note the representative counter for the current transaction resets, such that any current value always is associated with subscript "n". As such, next the current cost $CC_n$ 845 is determined. After determining any intervening cost based on the difference between $GC_n$ and $GCLS_{n-1}$, $CC_n$ is determined to have a value of (a+b+c) in block 882. Next, the global cost last seen $GCLS_n$ is updated to match the updated GC 850 in block 885, such that $GCLS_n$ is of value "a+b+c" in block 881. The values for the flow scheduler instance 1 in blocks 883 and 884 remain the same as in blocks 873 and 874 for clock time t-1.

Moving on to clock time t-3, states for applicable costs are shown, wherein an IO (e.g., IO-D) is scheduled by flow scheduler instance 0 (wherein IO-D has a cost of value "d") and simultaneously an IO (e.g., IO-E) is scheduled by flow scheduler instance 1 (wherein IO-E has a cost of value "e"). Following flow diagram 800A, the global cost GC 850 is updated with the cost of IO-D and IO-E to a value of "0+a+b+c+d+e" in block 895. Note the representative counter for the current transaction resets, such that any current value always is associated with subscript "n".

The following operations previously described in relation to FIG. 8A are performed for both flow scheduler instance 0 and instance 1. Considering flow scheduler instance 0, next the current cost $CC_n$ 845 is determined. After determining any intervening cost based on the difference between $GC_n$ (block 895) and $GCLS_{n-1}$ (block 881), $CC_n$ is determined to have a value of (a+b+c+d+e) in block 892. Next, the global cost last seen $GCLS_n$ is updated to match the updated GC 850 in block 895, such that $GCLS_n$ is of value "a+b+c+d+e" in block 891. Now considering flow scheduler instance 1, the current cost $CC_n$ 845 is determined. After determining any intervening cost based on the difference between $GC_n$ (block 895) and $GCLS_{n-1}$ (block 883), $CC_n$ is determined to have a value of (a+b+c+d+e) in block 894. Next, the global cost last seen $GCLS_n$ is updated to match the updated GC 850 in block 895, such that $GCLS_n$ is of value "a+b+c+d+e" in block 893. As shown in FIG. 8B, in association with clock time t-3, flow scheduler instances 0 and 1 have the same values for GCLS and CC.

Figure 9:
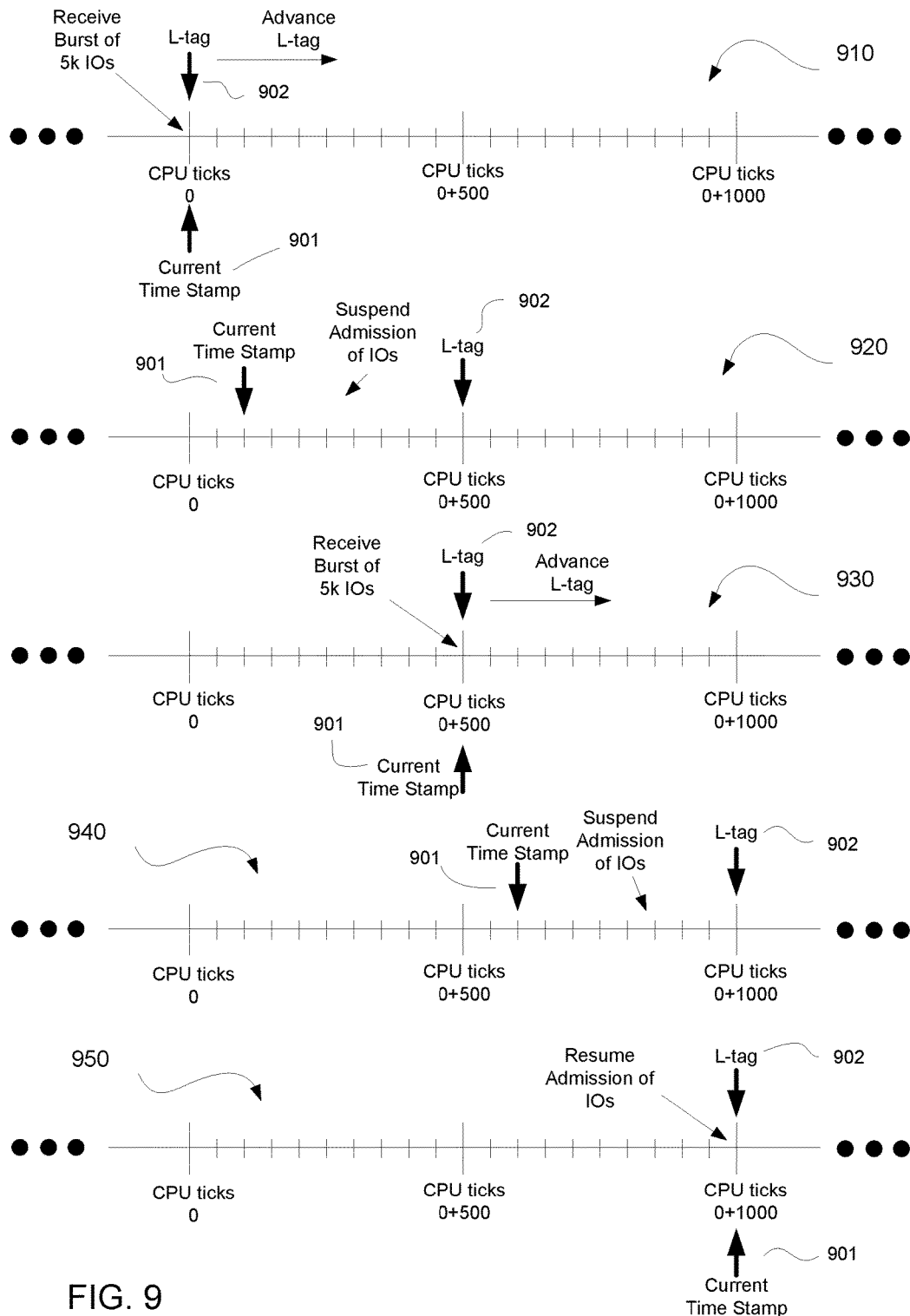
FIG. 9 is a diagram showing the implementation of rate limiting across the various flows controlling access to the portion of the data storage system (e.g., LUN, volume, etc.), in accordance with one embodiment of the present disclosure.

FIG. 9 is a diagram showing the implementation of rate limiting across the various flows controlling access to the portion of the data storage system (e.g., LUN, volume, etc.), in accordance with one embodiment of the present disclosure. Through the use of shared currency (e.g., tertiary costs accounting for the number of IOs and secondary costs accounting for the number of bytes consumed), rate limiting is implemented at each of the flow schedulers to provide precise admission control of IOs for a particular LUN. In embodiments, a rate limit mechanism is handled by the CPU schedulers that are configured to use a rate limit algorithm and a high precision timer to limit IOPS and/or throughput at various levels of a scheduler hierarchy, such as the hierarchy shown in or described in relation to FIG. 5B. For example, rate limiting may be provided at the flow scheduler level, or at various folder levels above the flow schedulers.

In one embodiment, rate limiting is implemented for the LUN at each flow scheduler admitting IOs to the LUN. For example, the same rate limit or limits (e.g., IOPS, bytes, throughput) may be assigned to each flow scheduler (e.g., AdmitRead flow scheduler, AdmitWrite flow scheduler and AdmitRemoteWrite flow scheduler) used for accessing the LUN. When any flow scheduler exceeds its rate limit, admission of IOs for that flow scheduler will be suspended. Because embodiments of the present invention use a shared cost or currency that make each flow scheduler aware of costs incurred by the other flow schedulers, other flow schedulers will also exceed the same rate limit or limits when making their next admissions, and will also suspend admissions. In that manner, all the flow schedulers are effectively suspended from admitting IOs until conditions are again satisfactory for admission of IOs.

In one embodiment, the rate limit is achieved by referencing an accumulating limit tag against a current time stamp. In one embodiment, the rate limit algorithm is utilized to compare the limit tag against the current time stamp, wherein the rate limit algorithm can be integrated directly within the CPU scheduler hierarchy. In addition, the limit tag is determined based on values determined during cross-charging, as previously described. As such, the comparison of the limit tag to the current time stamp and cross-charging achieves the desired IOPS or throughput limits on a corresponding LUN. In addition, rate limits can be set to flow schedulers and/or folder schedulers.

In one embodiment, the accumulating limit tag, as managed by the limit tag manager 740, may represent the number of logical ticks (CPU cycles) that are to be consumed by the scheduler (e.g., flow scheduler, folder scheduler, etc.) for a given set of scheduled IOs, and is calculated as follows in the following equation:

$$\text{Limit tag} = \frac{\text{cost}}{\text{rate limit } (IOPS \text{ or bytes})} \times (\text{number of } CPU \text{ ticks\_per\_sec}) \quad (2)$$

If the limit tag exceeds the current timestamp, then the entity is suspended for the amount of ticks it exceeds. In that manner, embodiments of the present invention are able to provide limit sets (e.g., IOPS, bytes, etc.) on a LUN that may affect both reads and writes. Previously, a rate limit only applies to one type of scheduler, for example a read scheduler or a write scheduler, such that setting a rate limit on one scheduler (e.g., read scheduler) has no affect or influence on the other write schedulers accessing that LUN, because limit rates for reads and writes were previously independent of each other.

An example is given in FIG. 9 for implementing rate limiting. Though rate limiting is described as applied at a particular flow scheduler, the rate limiting may equally be applied at a folder scheduler, or higher.

Graph 910 illustrates timeline of CPU ticks. A current time stamp 901 is located at a value of 0 CPU ticks. For purposes of illustration, the limit tag 902 is also located at value 0 for CPU ticks as a starting value. In addition, a burst of 5,000 IOs is scheduled at this particular flow scheduler instance, in one embodiment, and a determination is made whether to suspend future admissions to this flow scheduler. In another embodiment, the burst of 5,000 IOs is being considered for admission and has not been scheduled. Because of the scheduling of 5,000 IOs, the limit tag 902 is advanced, as will be shown in graph 920.

Graph 920 shows the advancement of the limit tag 902, after a period of calculation denoted by a number of CPU ticks. The limit tag 902 is advanced by applying Eqn. 2. For a given throughput limit of 10,000 IOs per second (10 k IOPS), a burst of 5 k IOs represents one half (50 percent) of the throughput limit, which when multiplied by the number of CPU ticks_per_second (e.g., 1,000), gives a value of 500 CPU ticks for advancement. As such, the accumulating limit tag 902 is advanced by 500 CPU ticks to +500 ticks to account for the 5,000 IOs currently scheduled. As shown in graph 920, the limit tag 902 exceeds the current time stamp 901, and as such, admissions for this particular flow scheduler are suspended. The suspension is lifted when the current time stamp 901 reaches the position of the limit tag 902 at +500 CPU ticks. That is, IOs can be admitted to the flow scheduler as long as the limit tag 902 is equal to or below the current time stamp 901 in terms of CPU ticks.

Graph 930 shows that the admission suspension has been lifted, as the current time stamp 901 has reached the limit tag 902 at +500 CPU ticks. At this point, another burst of 5,000 IOs has been received, and scheduled since there is no suspension of admissions. Again, the limit tag needs to be advanced because of the scheduling of 5,000 IOs, as will be shown in graph 940.

Graph 940 shows the advancement of the limit tag 902, after a period of calculation denoted by a number of CPU ticks. The limit tag 902 is advanced by applying Eqn. 2. For a given throughput limit of 10,000 IOs per second (10 k IOPS), a burst of 5 k IOs represents one half (50 percent) of the throughput limit, which when multiplied by the number of CPU ticks_per_second (e.g., 1,000), gives a value of 500 CPU ticks for advancement. As such, the accumulating limit tag 902 is advanced by 500 CPU ticks to +1000 CPU ticks to account for the second set of 5,000 IOs currently scheduled. As shown in graph 940, the limit tag 902 again exceeds the current time stamp 901, and as such, admissions for this particular flow scheduler are suspended. The suspension is lifted when the current time stamp 901 reaches the position of the limit tag 902 at +1000 CPU ticks, as is shown in graph 950. That is, IOs can be again admitted to the flow scheduler when the current time stamp 901 reaches the limit tag 902.

Accordingly, embodiments of the present disclosure disclosing cross-charging of costs incurred when executing operations across the various flow schedulers scheduling IOs to a portion of a data storage system (e.g., a LUN, volume, etc.) in order to fairly schedule operations across the flow schedulers and to provide rate limiting for that portion of the data storage system, have been described. While specific embodiments have been provided to demonstrate the fair allocation of resources of a flow based on cross-charging of costs, these are described by way of example and not by way of limitation. Those skilled in the art having read the present disclosure will realize additional embodiments falling within the spirit and scope of the present disclosure.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for scheduling operations in a storage system including a scheduler hierarchy, comprising:
    scheduling a first Input/Output (IO) of a first flow scheduler of a first flow, the first flow scheduler to schedule IOs accessing a volume as executed on a first core processor, wherein the first IO has a first cost corresponding to access to the volume by the first IO;
    updating a global cost with the first cost, wherein the global cost is an accumulating cost that corresponds to access to the volume by IOs scheduled by a plurality of flow schedulers of a plurality of core processors, including the first core processor, of a CPU;
    determining an intervening cost of at least one IO scheduled before the first IO by one or more of the plurality of flow schedulers based on the global cost for execution by the plurality of core processors, wherein the intervening cost is a difference between a global cost last seen by the first flow scheduler and the updated accumulating global cost, and wherein the plurality of flow schedulers are to schedule IOs accessing the volume as executed on the plurality of core processors; and
    updating an accumulating current cost for the first flow scheduler based on the first cost and the intervening cost.

2. The method of claim 1, wherein the first cost is an IO count.

3. The method of claim 1, wherein the first cost is a number of bytes.

4. The method of claim 1, wherein the first flow scheduler comprises a write flow scheduler or a read flow scheduler.

5. The method of claim 1, further comprising:
    updating the global cost last seen with the updated global cost.

6. The method of claim 1, further comprising:
    independently setting IOPS and MBPS limits for the volume, each controlling scheduling of IOs through a corresponding accumulating current cost.

7. The method of claim 1, further comprising:
    independently setting TOPS and MBPS limits for a folder, each controlling scheduling of IOs through a corresponding accumulating current cost, wherein the folder includes one or more of volumes and folders in combination.

8. A storage system, comprising:
    a non-volatile memory (NVRAM) to store incoming write requests;
    a solid state device (SSD) configured as read cache memory;
    a hard disk drive (HDD); and
    a central processing unit (CPU) comprising a plurality of core processors and to execute instructions to:
        schedule a first Input/Output (IO) of a first flow scheduler of a first flow, the first flow scheduler to schedule IOs accessing a volume as executed on a first core processor, wherein the first IO has a first cost corresponding to access to the volume by the first IO;
        update a global cost with the first cost, wherein the global cost is an accumulating cost that corresponds to access to the volume by IOs scheduled by a plurality of flow schedulers of the plurality of core processors, including the first core processor;

determine an intervening cost of at least one IO scheduled before the first IO by one or more of the plurality of flow schedulers based on the global cost for execution by the plurality of core processors, wherein the intervening cost is a difference between a global cost last seen by the first flow scheduler and the updated accumulating global cost, and wherein the plurality of flow schedulers are to schedule IOs accessing the volume as executed on the plurality of core processors; and update an accumulating current cost for the first flow scheduler based on the first cost and the intervening cost.

9. The storage system of claim 8, wherein the first cost is an IO count.

10. The storage system of claim 8, wherein the first cost is a number of bytes.

11. The storage system of claim 8, wherein the first flow scheduler comprises a write flow scheduler or a read flow scheduler.

12. The storage system of claim 8, the CPU to execute the instructions to:

update the global cost last seen with the updated accumulating global cost.

13. The computer-readable medium of claim 8, wherein the instructions are further to cause the processor to:

update the global cost last seen with the updated accumulating global cost.

14. A non-transitory computer-readable medium comprising instructions that, when executed by a processor, cause the processor to:

schedule a first Input/Output (IO) of a first flow scheduler of a first flow, the first flow scheduler to schedule IOs accessing a volume as executed on a first core processor, wherein the first IO has a first cost corresponding to access to the volume by the first IO;

update a global cost with the first cost, wherein the global cost is an accumulating cost that corresponds to access to the volume by IOs by a plurality of flow schedulers of a plurality of core processors of a CPU, including the first core processor;

determine an intervening cost of at least one IO scheduled before the first IO by one or more of the plurality of flow schedulers based on the global cost for execution by the plurality of core processors, wherein the intervening cost is a difference between a global cost last seen by the first flow scheduler and the updated accumulating global cost, and wherein the plurality of flow schedulers are to schedule IOs accessing the volume as executed on the plurality of core processors; and update an accumulating current cost for the first flow scheduler based on the first cost and the intervening cost.

15. The computer-readable medium of claim 14, wherein the first cost is an IO count.

16. The computer-readable medium of claim 14, wherein the first cost is a number of bytes.

17. The computer-readable medium of claim 14, wherein the first flow comprises a write flow scheduler or a read flow scheduler.

18. The computer-readable medium of claim 14, wherein the instructions are further to cause the processor to:

independently set IOPS and MBPS limits for the volume, each controlling scheduling of IOs through a corresponding accumulating current cost.

* * * * *